(12) United States Patent
Palese

(10) Patent No.: US 9,949,492 B2
(45) Date of Patent: Apr. 24, 2018

(54) PATTY MAKER

(71) Applicant: BLUE SKY INNOVATION GROUP, INC, Avon, OH (US)

(72) Inventor: Jeffrey W. Palese, North Ridgeville, OH (US)

(73) Assignee: Blue Sky Innovation Group, Avon, OH (US)

( * ) Notice: Subject to any disclaimer, the term of this patent is extended or adjusted under 35 U.S.C. 154(b) by 0 days.

(21) Appl. No.: 15/009,865

(22) Filed: Jan. 29, 2016

(65) Prior Publication Data
US 2017/0215438 A1    Aug. 3, 2017

(51) Int. Cl.
*A22C 7/00* (2006.01)
*A23P 30/10* (2016.01)
*A47J 43/20* (2006.01)

(52) U.S. Cl.
CPC .......... *A22C 7/0038* (2013.01); *A22C 7/0084* (2013.01); *A23P 30/10* (2016.08); *A47J 43/20* (2013.01)

(58) Field of Classification Search
CPC .............................. A22C 7/0038; A22C 7/0084
See application file for complete search history.

(56) References Cited

U.S. PATENT DOCUMENTS

| 3,550,189 A * | 12/1970 | Lotz | A22C 7/0076 425/156 |
| 3,733,652 A * | 5/1973 | House | A22C 7/00 425/338 |
| 2004/0247759 A1* | 12/2004 | Palese | A22C 7/0076 426/512 |
| 2005/0013895 A1* | 1/2005 | Azzar | A22C 7/00 425/572 |

OTHER PUBLICATIONS

Burger Enterprise Video, [Video], source is YouTube, https://www.youtube.com/watch?v=3uzXmjc577w , retrieval Sep. 6, 2017, publication date Sep. 17, 2013.*

* cited by examiner

*Primary Examiner* — Jill L Heitbrink
(74) *Attorney, Agent, or Firm* — Tarolli, Sundheim, Covell & Tummino LLP

(57) ABSTRACT

An apparatus for making patties with a ground food product includes a housing including an inlet for receiving the ground food product. A mold plate is positioned at least partially within the housing and includes first and second mold cavities. The mold plate is rotatable about an axis to first and second mold positions. In the first mold position, the first mold cavity is positioned within the housing for receiving the ground food product and the second mold cavity is positioned outside the housing for removing a patty formed therein. In the second mold position, the second mold cavity is positioned within the housing for receiving the ground food product and the first mold cavity is positioned outside the housing for removing a patty formed therein.

10 Claims, 8 Drawing Sheets

PATTY MAKER

TECHNICAL FIELD

This disclosure relates to a food processing apparatus. More specifically, this disclosure relates to a patty maker attachment for a meat grinder.

BACKGROUND

Grinders are food processing appliances that are used to grind, chop or mince food products, such as meat, fish, poultry, vegetables, or similar foods. The most common food products processed in a grinder are meat products, such as beef, pork, venison, etc. A typical grinder includes head with an inlet or chute into which raw meat is fed, and an outlet from which the ground or minced meat is discharged. The outlet of a grinder head can be outfitted with an accessory, such as a sausage stuffing tube, the helps direct the ground meat into sausage casing. The accessories typically are connected to the grinder head via a collar, connected to the outlet, that retains a cutting die of the grinder in the cutlet.

SUMMARY

An apparatus for making patties with a ground food product includes a housing including an inlet for receiving the ground food product. A mold plate is positioned at least partially within the housing and includes first and second mold cavities. The mold plate is rotatable about an axis to first and second mold positions. In the first mold position, the first mold cavity is positioned within the housing for receiving the ground food product and the second mold cavity is positioned outside the housing for removing a patty formed therein. In the second mold position, the second mold cavity is positioned within the housing for receiving the ground food product and the first mold cavity is positioned outside the housing for removing a patty formed therein.

According to one aspect, the apparatus can also include a patty elector that is rotatable about the axis relative to the mold plate and that is actuatable to eject patties from the first and second mold cavities when positioned outside the housing.

According to another aspect, alone or in combination with any of the preceding aspects, the patty ejector can include a handle portion for grasping and manually rotating the patty ejector and for actuating the patty ejector to eject patties from the mold cavities.

According to another aspect, alone or m combination with any of the preceding aspects, the patty ejector can also include an ejector paddle opposite the handle portion. The ejector paddle can engage and eject the patties formed in the first and second mold portions.

According to another aspect, alone or in combination with any of the preceding aspects, the patty ejector can be pivotable transverse to the axis to eject the patties from the mold cavities.

According to another aspect, alone or in combination with any of the preceding aspects, the patty ejector can include a mold actuator portion positioned between stop points on the mold plate. The patty ejector can be movable relative to the mold plate to mold actuator positions between the stop points. The engagement between the mold actuator and the stop points can cause the mold plate to rotate with the ejector paddle.

According to another aspect, alone or in combination with any of the preceding aspects, the patty elector can include a mold actuator portion positioned in an arc-shaped notch in the mold plate that is bounded at opposite ends by stop points. The mold actuator can move within the notch between the stop points relative to the mold plate when the patty ejector is rotated.

According to another aspect, alone or in combination with any of the preceding aspects, the patty ejector can be rotatable in a first direction relative to the mold plate into engagement with a first portion of the mold plate. Further rotational movement of the patty ejector in the first direction while engaging the first portion of the mold plate can cause the mold plate to rotate relative to the housing to the first mold position. The patty ejector while in the first mold position can be pivotable transverse to the axis to eject a patty from the second mold cavity positioned outside the housing. The patty ejector can also be rotatable in a second direction, opposite the first direction, relative to the mold plate into engagement with a second portion of the mold plate. Further rotational movement of the patty ejector in the second direction while engaging the second portion of the mold plate can cause the mold plate to rotate relative to the housing to the second mold position. The patty ejector while in the second mold position can be pivotable transverse to the axis to eject a patty from the first mold cavity positioned outside the housing.

According to another aspect atone or in combination with any of the preceding aspects, the patty ejector can be configured to be positioned to eject a patty from the first mold cavity while the second mold cavity is filled with the ground food product. The patty ejector can be configured to be positioned to eject a patty from the second mold cavity while the first mold cavity is filled with the ground food product.

According to another aspect, alone or in combination with any of the preceding aspects, the housing can include a base plate and a cover plate that are connected to each other to define a chamber. The first mold cavity can be positioned in the chamber when the mold plate is in the first mold position, and the second mold cavity can be positioned in the chamber when the mold plate is in the second mold position.

According to another aspect, alone or in combination with any of the preceding aspects, the base plate can be correctable to a food processing apparatus to receive the ground food product end direct the ground food product into the chamber and into the mold cavity positioned therein.

According to another aspect alone or in combination with any of the preceding aspects, the cover plate can be constructed with a transparent material so that a user can view the mold cavity positioned in the chamber while it is being filled with the ground food product.

BRIEF DESCRIPTION OF THE DRAWINGS

For a better understanding, reference may be made to the accompanying drawings.

DESCRIPTION OF EMBODIMENTS

Figure 1:
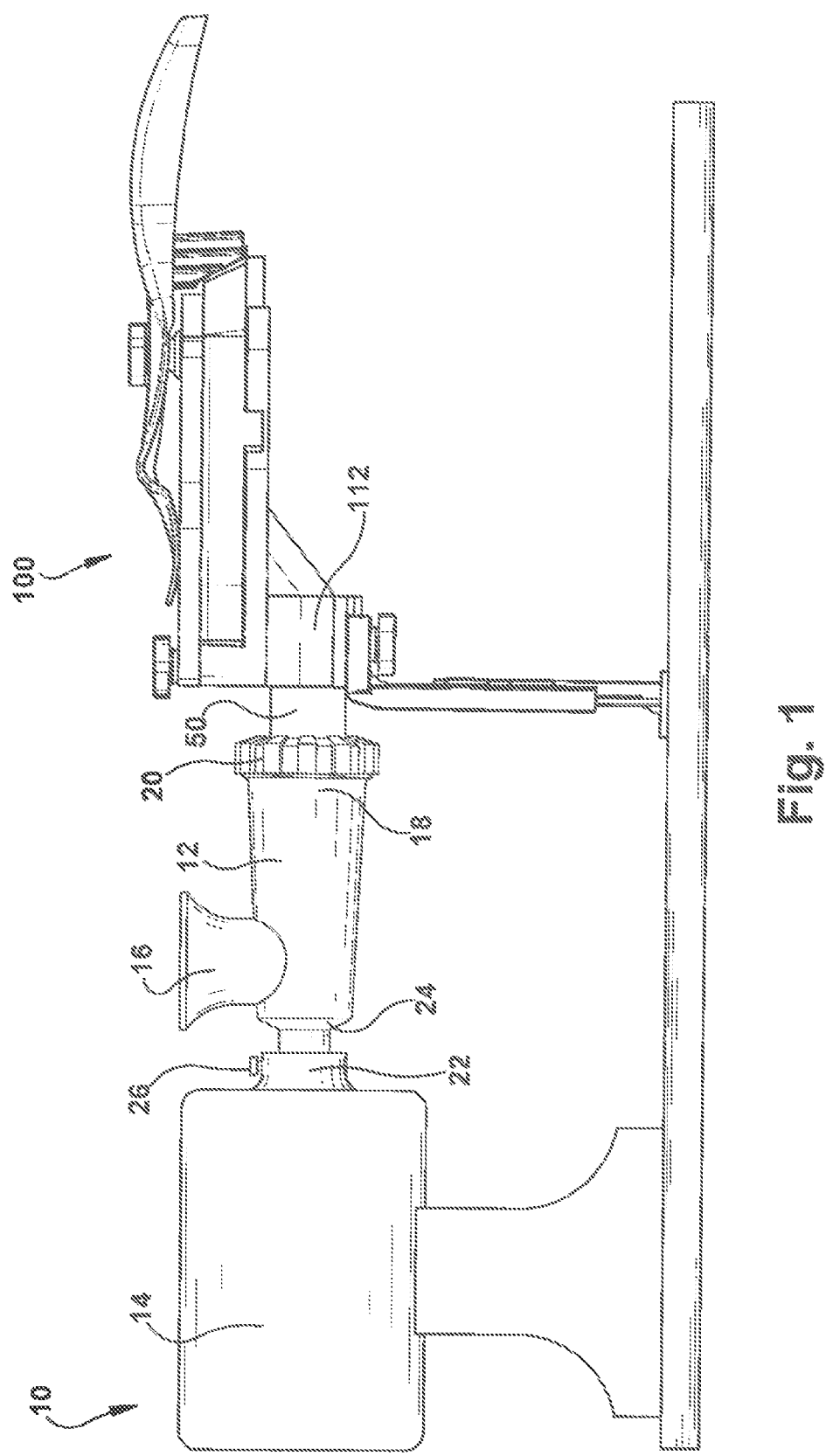
FIG. 1 is a side view of a patty making apparatus installed on a conventional meat grinder.

FIG. 1 illustrates a food processing apparatus in the form of a grinder 10 for food products, such as meat. The grinder 10 includes a grinder head 12 and a drive unit 14, such as an electric motor. The electric motor drive unit could be replaced with a hand crank. The grinder head 12 includes an inlet or chute 16, into which food product, such as raw meat, is fed, and an outlet 18 from which the ground or minced food product is discharged. The grinder head 12 houses typical grinder components, such as an auger/screw conveyor, a rotating knife including mincing blades, and a fixed hole plate or die, which is positioned at the outlet 18 and retained therein by a collar 20. These typical components are shown, for example, in U.S. Pat. No. 7,207,510 B2, issued Apr. 24, 2007, the disclosure of which is hereby incorporated by reference in its entirety.

The grinder head 12 is connectable to the drive unit 14 via a connection to an output coupling 22 that is adapted to receive a mating input coupling 24 of the grinder head 12. The input coupling 24 is received in the output coupling 22 and locked in place by a locking member 26, such as a thumb screw, to mount the grinder head 12 on the drive unit 14. When the grinder head 12 is coupled to the drive unit 14, an output shaft (not shown) of the drive unit engages and couples with an input shaft of the grinder head so that operation of the drive unit causes rotation of the output shaft, which imparts rotation to the input shaft, thus operating the grinder head. The output coupling 22 permits the drive unit 14 to be coupled with and drive any device or apparatus having a mating input coupling 24.

An apparatus 100 for making patties, referred to herein as a patty maker, is connected to the grinder 10. To facilitate this connection, a feeder tube 50 connects the patty maker 100 to the outlet 18 of the grinder 10. The feeder tube 50 can, for example, extend through the collar 20 and include an annular flange (not shown) that is impinged between the collar and the outlet 18 of the grinder head 12. An opposite end of the feeder tube 50 can be connected to an inlet portion 112 of the patty maker 100 and thereby can direct ground food product into the patty maker.

Figure 2:
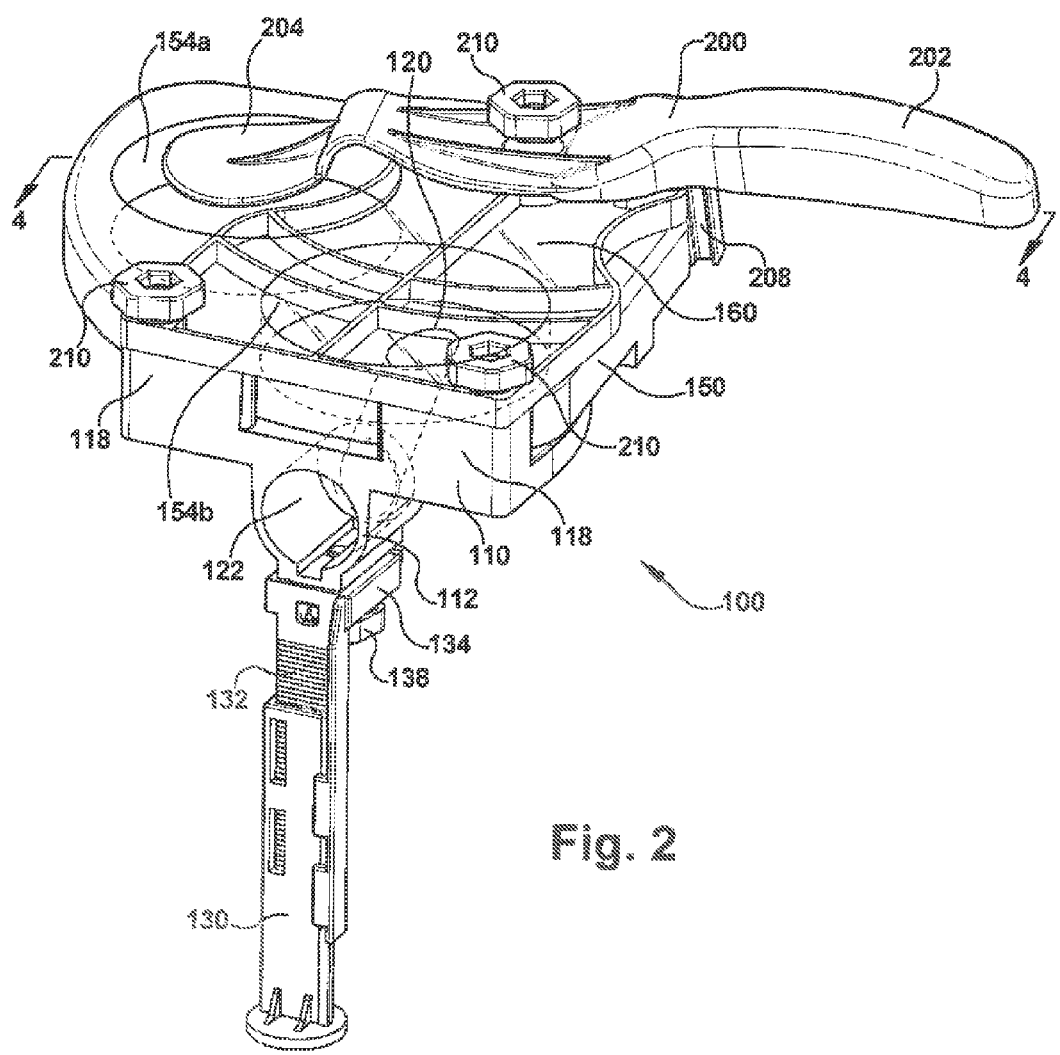
FIG. 2 is a perspective view of the patty making apparatus of FIG. 1.
Figure 3:
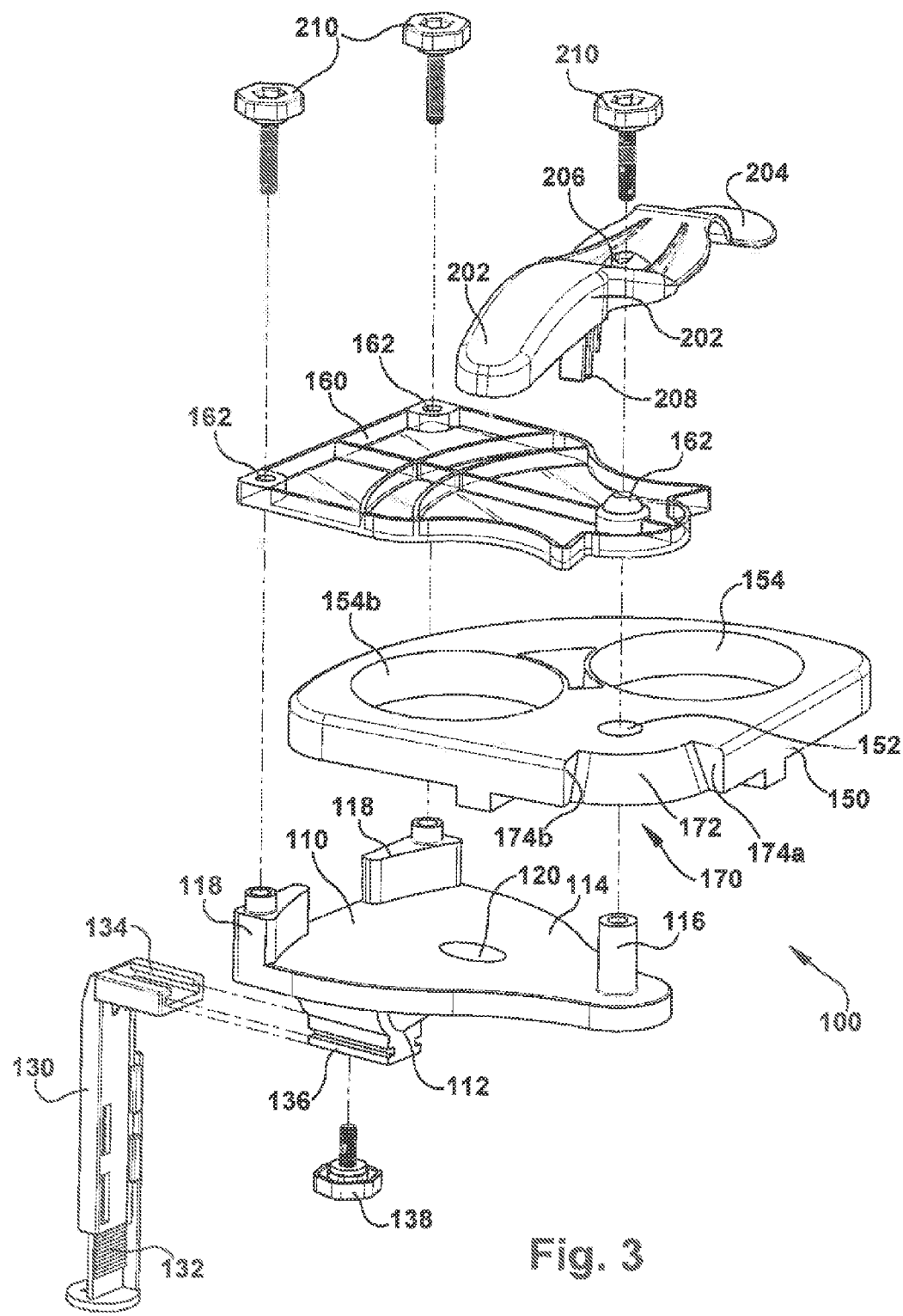
FIG. 3 is an exploded perspective view of the patty making apparatus.
Figure 4:
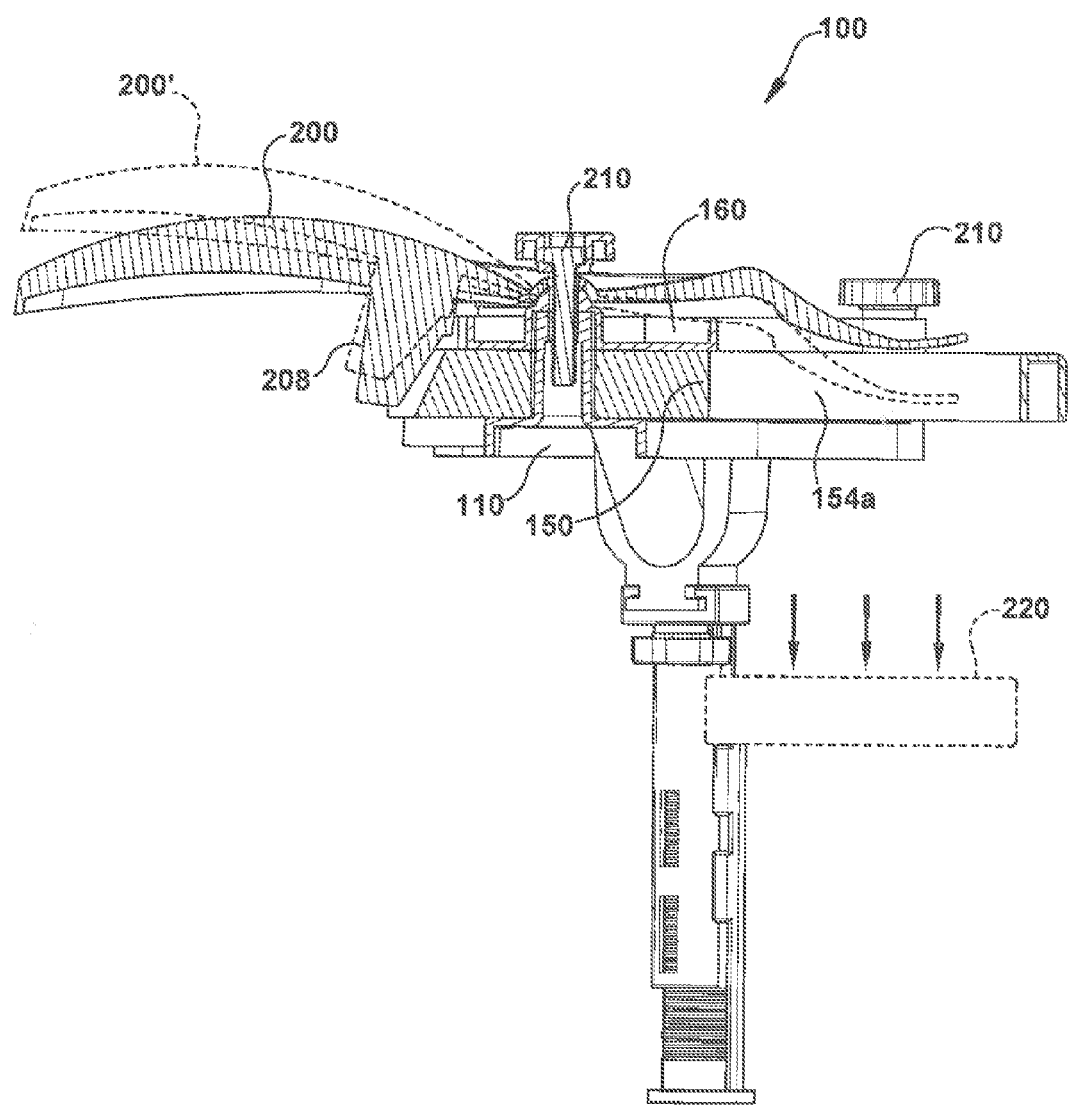
FIG. 4 is a sectional view of portions of the patty making apparatus.

Referring to FIGS. 2-4, the patty maker 100 includes a base plate 110, which includes the inlet portion 112, and thereby facilitates directing the ground food product into the patty maker. The base plate 110 has a generally planar upper surface 114 from which a pivot pin or post 116 projects. The pivot post 116 includes a fastener receiving opening. The base plate 110 also includes a pair of cover support portions 118 that project from the upper surface 114, each of which include a fastener receiving portion. An opening 120 in the surface 114 provides fluid communication with an inner conduit 122 of the inlet 112 (see especially FIG. 4).

The patty maker 100 also includes a support leg 130 for helping to stabilize the patty maker on a work surface during use (see FIG. 1). The support leg 130 can have an adjustable length in order to facilitate connections of the patty maker to grinders 10 of differing heights. This adjustable length can, for example, be achieved by configuring the support leg 130 with a two-piece telescoping construction, such as that illustrated in FIGS. 2 and 3, with a toothed rack mechanism 132 for maintaining the leg at the selected length.

The support leg 130 can also include a connector portion 134 for facilitating its connection to and removal from the base plate 110, in the example embodiment illustrated herein, the support leg 130 is connected to the inlet portion 112 of the base plate 110. The connection between the support leg 130 and the base plate 110 can, for example, be facilitated by a channel on the connector portion 134 with a T-shaped cross-section that receives a projection 136 on the inlet portion 112 with a mating T-shaped cross-section. A fastener 138, such as a thumbscrew, can be used to maintain the connection between the support leg 130 and the inlet portion 112.

The patty maker 100 also includes a mold plate 150 that has a generally planar configuration. The mold plate 150 includes a small cylindrical pivot opening 152 that extends through the plate. The mold plate 150 also includes two large cylindrical mold cavities 154a, 154b that extend through the plate. The mold cavities 154a, 154b are illustrated as being cylindrical (see FIG. 4), but could alternatively have a slightly tapered sidewall configuration, wide end facing down, which would make the sidewalls frusto-conical, rather than cylindrical in nature. The taper can, however, be slight so that the mold cavities 154a, 154b appear to be cylindrical in nature.

The patty maker 100 also includes a generally flat cover plate 160 that mimics the shape or layout of the base plate 110. As shown in the figures, the cover plate 160 can be constructed of a translucent material, such as plastic. The cover plate 160 includes fastener openings 162 that are configured and arranged to coincide with the fastener receiving portions in the pivot post 116 and cover support portions 118 of the base plate 110.

Figure 5:
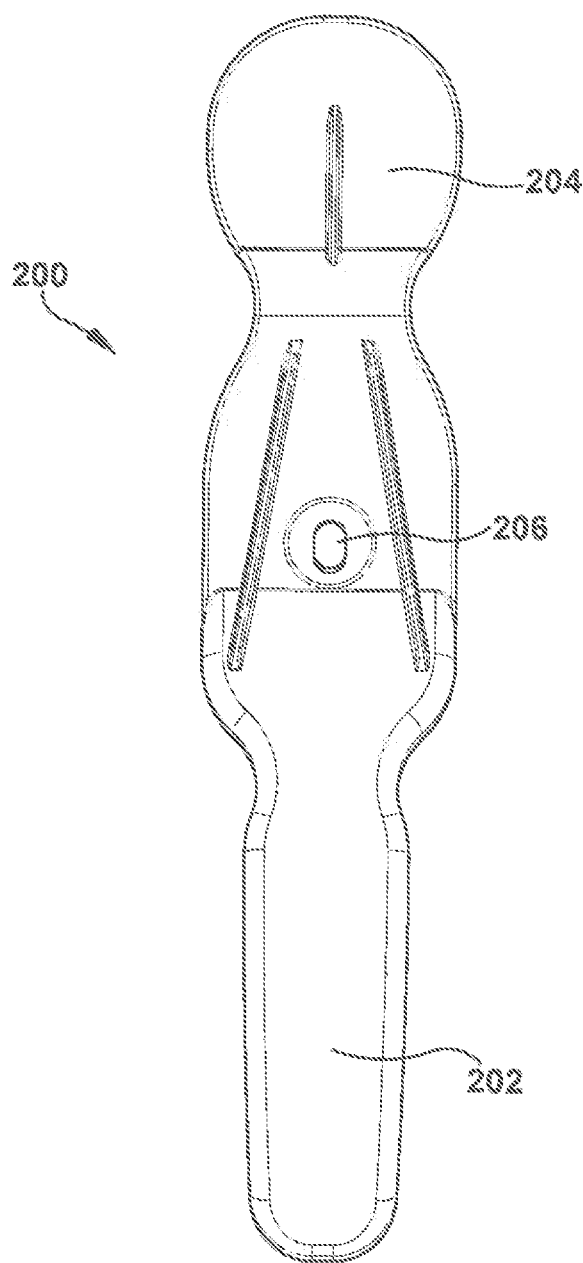
FIG. 5 is a top view of a handle portion of the patty making apparatus.

The patty maker 100 further includes a patty ejector 200 with a first end including a handle portion 202 and an opposite second end including an ejector paddle 204. The patty ejector 200 also includes a fastener receiving opening 206 positioned generally centrally, between the handle portion 202 and ejector paddle 204. As shown best in FIG. 5, the fastener receiving opening 206 can have an elongated configuration. The patty ejector 200 also includes a mold actuator 208 that projects from a lower surface of the handle portion 202.

To assemble the patty maker 100, the mold plate 150 is positioned on the upper surface 114 of the base 110 so that the pivot post 116 is received in the pivot opening 152. In this condition, the pivot post 116 has a terminal portion that extends through and projects from an upper surface of the mold plate 150. Next, the cover plate 160 is placed over the mold plate 160 so that the projecting terminal portion of the pivot post 116 along with fastener receiving portions of the cover support portions 118 are received in the corresponding fastener openings 162. The patty ejector 200 is positioned so its fastener receiving opening 206 coincides with the fastener receiving portion of the pivot post 116. Fasteners 210 are installed in the fastener receiving portions of the pivot post 116 and the cover support portions 118 to complete the assembly of the patty maker 100.

In the assembled condition of the patty maker 100, the base plate 110 and cover plate 160 are fixed to each other and define a housing structure for the mold plate 150. The mold plate 150 and patty elector 200 can pivot on the pivot post 116 about an axis 212 relative to the assemblage of the base plate 110 and cover plate 160, i.e., relative to the housing. The mold plate 150 and patty ejector 200 also can pivot about the axis 212 independently and relative to each other.

In the assembled condition, the mold actuator 208 is positioned in an actuator receiving portion 170 of the mold plate 150. The actuator receiving portion 170 is in the form of an elongated arc-shaped notch in the mold plate 150 that is centered on the axis 212. The actuator receiving portion 170 includes extends includes an arc-shaped side wall 172 that extends about the axis 212 and has opposite ends bounded by stop points 174a and 174b. The stop points 174a. 174b project transversely outward from the side wall 172.

Additionally, the elongated form of the fastener receiving opening 206 in the patty ejector 200 allows for a certain degree of pivotal movement of the ejector in directions transverse to the axis 212. This transverse pivotal movement of the patty ejector 200 can, for example, be perpendicular or substantially perpendicular to the axis 212, as shown generally in dashed lines at 200' in FIG. 4.

Figure 6A:
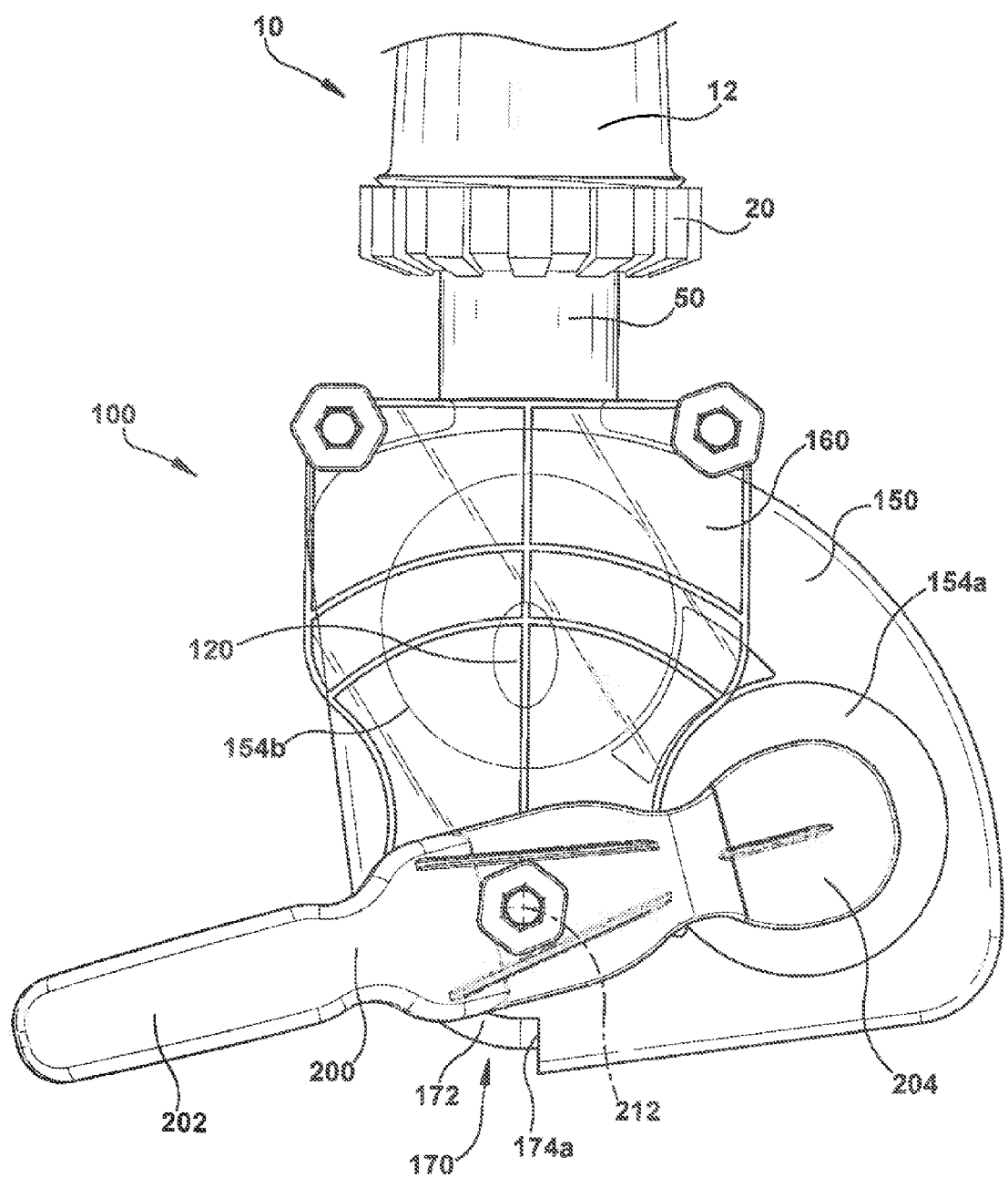
FIGS. 6A-6C are top views illustrating the patty making apparatus in different conditions depicting its operation.
Figure 6B:
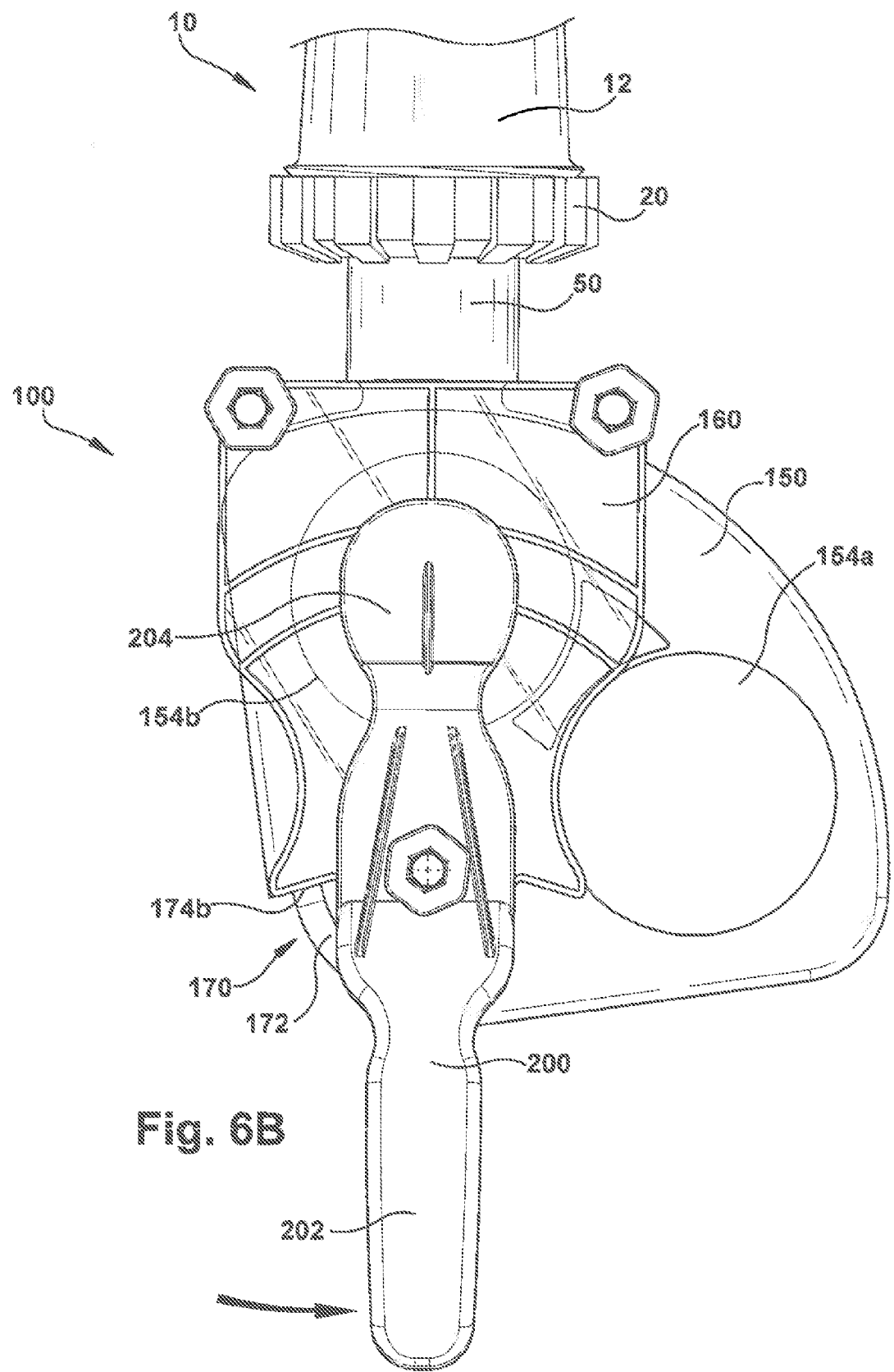
Figure 6C:
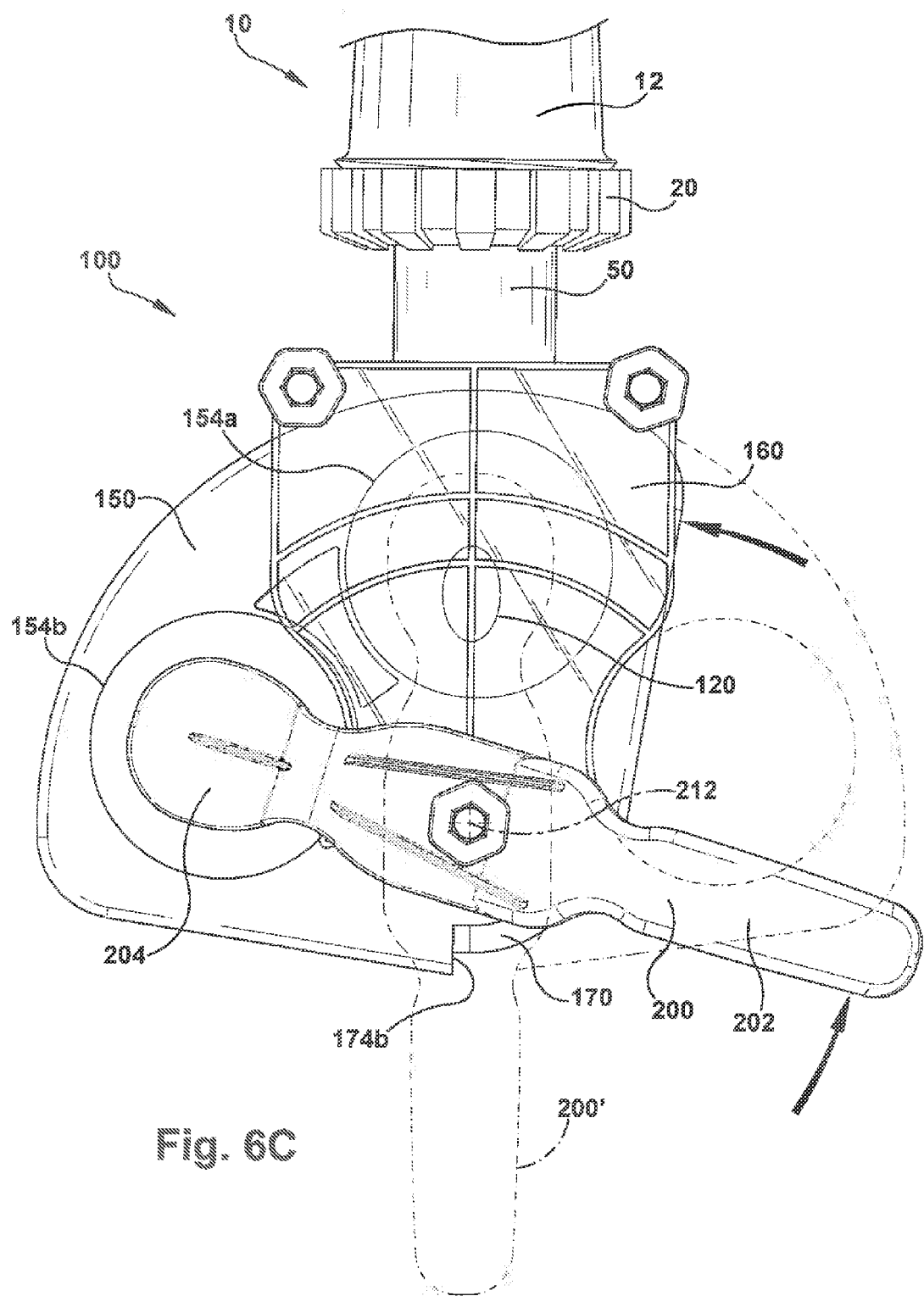

Referring to FIGS. 6A-6C, grasping the handle portion 202 of the patty ejector 200, the user can rotate or pivot the mold plate 150 to operate the patty maker 100. To do so, the patty ejector 200 is movable to one of three positions, which are illustrated in FIGS. 6A-8C, respectively, to move the mold plate 150 to one of two positions, which are illustrated in FIGS. 6A and 6C, respectively.

Referring to FIG. 6A, the mold plate 150 and patty ejector 200 are positioned in a first position, pivoted or rotated to an end-of-travel position in the clockwise direction, as viewed from above. In this position, the mold plate 150 is positioned such that the mold cavity 154a is placed the space between the base plate 110 and the cover plate 160. The other mold cavity 154b is positioned in the space between the base plate 110 and cover plate 160 such that the mold cavity 154b is bounded on the top and bottom, defining a closed, cylindrical, patty-shaped space in communication with the inner conduit 122 (see FIG. 4) via the opening 120.

In the position of FIG. 6A, the ejector paddle 204 is positioned centrally above the mold cavity 164a, which is positioned outside the space between the base plate 110 and the cover plate 160. From the position of FIG. 6A, the patty ejector 200 can be rotated in a counterclockwise direction, as indicated generally by the arrow in FIG. 6A, to the second handle position, which is illustrated in FIG. 6B. As shown in FIG. 6B, when the patty ejector 200 moves from the first position to the second position, the position of the mold plate 150 is not affected, and it remains in the first position.

When the patty ejector 200 rotates relative to the mold plate 150, the mold actuator 208 moves within the actuator receiving portion 170 of the mold plate 150. When the patty ejector 200 moves from the first position of FIG. 6A to the second position of FIG. 6B, the mold actuator 208 travels within the actuator receiving portion 170 from a position adjacent or against the stop point 174a toward the stop point 174b. When the patty ejector 200 reaches the position illustrated in FIG. 6B, the mold actuator 208 is positioned adjacent or against the stop point 174b.

When the patty ejector 200 is rotated from the second position illustrated in FIG. 6B toward the third position of 6C, the engagement of the mold actuator 208 with the stop point 174b causes the mold plate 150 to rotate with the patty ejector 200 about the axis 212. The patty ejector 200 thus moves the mold plate 150 irons the first mold position of FIGS. 6A and 6B to the second mold position of FIG. 6C. In the position of FIG. 6C, the ejector paddle 204 is positioned centrally above the mold cavity 154b, which is positioned outside the space between the base plate 110 and the cover plate 160.

Rotation of the patty ejector 200 in the opposite direction has the same effect. When the patty ejector 200 moves away from the ejector position of FIG. 6C, the mold actuator 208 travels within the actuator receiving portion 170 from adjacent the stop point 174b toward the stop point 174b, while the mold plate 150 does not move. The mold actuator 208 eventually reaches the stop point 174a, as shown in phantom at 200' in FIG. 6B. When the patty ejector moves from the position 200' of FIG. 6B to the ejector position of FIG. 6A, the engagement of the mold actuator 208 with the stop point 174a causes the mold plate 150 to rotate with the patty ejector. The patty ejector 200 and the mold plate 150 thus move back to the first mold position (FIG. 6A), thus positioning the ejector paddle 204 is positioned centrally above the mold cavity 154a, which is positioned outside the space between the base plate 110 and the cover plate 160.

The patty maker 100 thus can operate in this manner, back and forth between the positions of FIGS. 6A and 6C as described above. In operation, the grinder 10 is operated to grind a food product, such as meat, which is discharged through the feeder tube 60 into the inlet 112 and inner conduit 122 of the patty maker 100. The inner conduit 122 directs the ground food product through the opening 120 in the base plate 110 and into whichever mold cavity 154a or 154b is positioned between the base plate and the cover plate 160. In the position of FIG. 6A, the mold cavity 154b is lilted. In the position of FIG. 6C, the mold cavity 154a is filled.

For sake of this description, beginning in the second mold position, the mold cavity 154a is filled first, forming a patty therein. Since the cover plate 160 is clean the user can view inside the mold cavity 154a as it is filled. Once the cavity 154a is filled, the user can operate the handle 202 to actuate the mold plate 150 to the first mold position. Mold cavity 154b is then filled, forming a patty therein, while mold cavity 154a is positioned outside the space between the base plate 110 and the cover plate 160. Referring to FIG. 4, the patty ejector 200 is actuated to pivot transverse to the axis 212, placing the ejector in the position illustrated at 200', which causes the patty 220 formed therein to be ejected. This process can be repeated back and forth, forming a patty in one of mold cavities 154a, 154b, while ejecting a patty from the other of the mold cavity.

While aspects of the apparatus for making patties have been particularly shown and described with reference to the preferred embodiment above, it will be understood by those of ordinary skill in the art that various additional embodiments may be contemplated without departing from the spirit and scope of the disclosed embodiments. Other aspects, objects, and advantages can be obtained from a study of the drawings, the disclosure, and the appended claims.

We claim:

1. An apparatus for making patties with a ground food product, comprising:
    a housing including an inlet for receiving the ground food product;
    a mold plate positioned at least partially within the housing and including first and second mold cavities, the mold plate being rotatable about an axis to first and second mold positions;
    wherein, in the first mold position, the first mold cavity is positioned within the housing for receiving the ground food product and the second mold cavity is positioned outside the housing for removing a patty formed therein; and
    wherein, in the second mold position, the second mold cavity is positioned within the housing for receiving the ground food product and the first mold cavity is positioned outside the housing for removing a patty formed therein
    wherein the apparatus further comprises a patty ejector that is rotatable about the axis relative to the mold plate and that is actuatable to eject patties from the first and second mold cavities when positioned outside the housing; and wherein the patty ejector comprises a mold actuator portion positioned in an arc-shaped notch in the mold plate that is bounded at opposite ends by stop points, wherein the mold actuator can move within the notch between the stop points relative to the mold plate when the patty ejector is rotated.

2. The apparatus recited in claim 1, wherein the patty ejector comprises a handle portion for grasping and manually rotating the patty ejector and for actuating the patty ejector to eject patties from the mold cavities.

3. The apparatus recited in claim 2, wherein the patty ejector further comprises an ejector paddle opposite the handle portion, the ejector paddle engaging and ejecting the patties formed in the first and second mold portions.

4. The apparatus recited in claim 3, wherein the patty ejector is pivotable transverse to the axis to eject the patties from the mold cavities.

5. The apparatus recited in claim 1, wherein the patty ejector comprises a mold actuator portion positioned between stop points on the mold plate, the patty ejector being movable relative to the mold plate to mold actuator positions between the stop points, wherein engagement between the mold actuator and the stop points causes the mold plate to rotate with the ejector paddle.

6. The apparatus recited in claim 1, wherein the patty ejector is configured to be positioned to eject a patty from the first mold cavity while the second mold cavity is filled with the ground food product, and wherein the patty ejector is configured to be positioned to eject a patty from the second mold cavity while the first mold cavity is filled with the ground food product.

7. The apparatus recited in claim 1, wherein the housing comprises a base plate and a cover plate that are connected to each other to define a chamber, wherein the first mold cavity is positioned in the chamber when the mold plate is in the first mold position, and wherein the second mold cavity is positioned in the chamber when the mold plate is in the second mold position.

8. The apparatus recited in claim 7, wherein the base plate is connectable to a food processing apparatus to receive the ground food product and direct the ground food product into the chamber and into the mold cavity positioned therein.

9. The apparatus recited in claim 7, wherein the cover plate is constructed with a transparent material so that a user can view the mold cavity positioned in the chamber while it is being filled with the ground food product.

10. An apparatus for making patties with a ground food product, comprising:
a housing including an inlet for receiving the ground food product;
a mold plate positioned at least partially within the housing and including first and second mold cavities, the mold plate being rotatable about an axis to first and second mold positions;
wherein, in the first mold position, the first mold cavity is positioned within the housing for receiving the ground food product and the second mold cavity is positioned outside the housing for removing a patty formed therein; and
wherein, in the second mold position, the second mold cavity is positioned within the housing for receiving the ground food product and the first mold cavity is positioned outside the housing for removing a patty formed therein
wherein the apparatus further comprises a patty ejector that is rotatable about the axis relative to the mold plate and that is actuatable to eject patties from the first and second mold cavities when positioned outside the housing; and
wherein the patty ejector is rotatable in a first direction relative to the mold plate into engagement with a first portion of the mold plate, and wherein further rotational movement of the patty ejector in the first direction while engaging the first portion of the mold plate causes the mold plate to rotate relative to the housing to the first mold position, the patty ejector while in the first mold position being pivotable transverse to the axis to eject a patty from the second mold cavity positioned outside the housing; and
wherein the patty ejector is rotatable in a second direction, opposite the first direction, relative to the mold plate into engagement with a second portion of the mold plate, and wherein further rotational movement of the patty ejector in the second direction while engaging the second portion of the mold plate causes the mold plate to rotate relative to the housing to the second mold position, the patty ejector while in the second mold position being pivotable transverse to the axis to eject a patty from the first mold cavity positioned outside the housing.

* * * * *